United States Patent [19]

Nelson

[11] Patent Number: 4,493,212
[45] Date of Patent: Jan. 15, 1985

[54] FIBER OPTIC MASS SENSOR

[75] Inventor: Arthur R. Nelson, Stow, Mass.

[73] Assignee: Aetna Telecommunications Laboratories, Westboro, Mass.

[21] Appl. No.: 420,361

[22] Filed: Sep. 20, 1982

[51] Int. Cl.³ .............................................. G01P 15/08
[52] U.S. Cl. ..................................... 73/517 R; 73/705
[58] Field of Search ............. 73/516 R, 517 R, 517 B, 73/705, 382 R; 250/231 R, 231 P, 227; 374/205

[56] References Cited

U.S. PATENT DOCUMENTS

| | | | |
|---|---|---|---|
| 2,131,738 | 10/1938 | Hoyt | 73/382 R |
| 2,412,541 | 12/1946 | Shivers | 73/705 |
| 2,695,165 | 11/1954 | Hansen | 73/517 B |
| 2,977,799 | 4/1961 | LaCoste | 73/382 R |
| 3,146,057 | 8/1964 | Rona | 73/517 R |
| 3,224,279 | 12/1965 | Galli et al. | 73/517 R |
| 3,463,931 | 8/1969 | Kormos | 250/231 R |
| 3,503,116 | 3/1970 | Strack | 73/705 X |
| 3,566,140 | 2/1971 | Granqvist | 250/227 |
| 3,691,850 | 9/1972 | Slater et al. | 73/517 B |
| 3,731,542 | 5/1973 | Forsberg | 73/516 R |
| 4,071,753 | 1/1978 | Fulenwider et al. | 250/227 |
| 4,300,813 | 11/1981 | Graver | 73/705 X |

Primary Examiner—James J. Gill
Attorney, Agent, or Firm—Weingarten, Schurgin, Gagnebin & Hayes

[57] ABSTRACT

An optical sensing system for detecting a physical parameter such as acceleration, temperature or pressure through parameter induced motion of an optical element in a fiber optic path. The motion of the optical element varies the light transmission through the path in which the optical element defines the relationship between motion and alteration in light transmission. In one embodiment the optical element includes a focusing system between an input and an output optical fiber to result in an increase in sensitivity by enhancement of the effect of motion of the optical element of the amount of light transmitted to the output fiber. The optical element may include or be attached to a mass to provide acceleration sensitivity for use in geophysical exploration. In addition, the optical element can be adapted to provide acceleration sensitivity in one direction in combination with insensitivity to acceleration in an orthogonal direction of particular use in such geophysical exploration. The optical element operates either by refraction or reflection and motion is imparted directly to the refracting or reflecting element or to an aperture applied thereto. The linearity between motion of the optical element and amount of light attenuation can be adjusted by the geometry of the system to provide a high degree of linearity or not as desired. The transmitted light can be detected in a ratioing mode in order to avoid effects of variation in light source intensity.

8 Claims, 15 Drawing Figures

FIBER OPTIC MASS SENSOR

FIELD AND BACKGROUND OF THE INVENTION

Instrumentation to detect various physical parameters such as acceleration or force, pressure and temperature has long been in demand. The availability of fiber optic technology makes practical the use of transducers which respond to one or more such physical parameters to alter the transmission of light along an optical fiber path. This provides inexpensive remote sensing in hostile environments.

Transducers of this sort have been provided in the past and various examples of such senses are shown in U.S. Pat. Nos. 4,300,813, 4071,753, 3,731,542, 3,566,140, 3,463,931, 3,224,279 and 3,146,057. Such systems utilized multi-mode light transmission along optical fibers and are relatively simple to construct but of limited sensitivity. Due to the circular geometry of optical fibers used in such systems, they are also highly nonlinear in the transfer function which relates the parameter being sensed to the amount of variation in the light transmitted along the optical path and ultimately to the output of the system. Such transducers also are sensitive to motion in at least two orthogonal directions unless physical restraints, likely to impede sensitivity, are applied to restrict motion.

SUMMARY OF THE INVENTION

In accordance with the teaching of the present invention an optical sensing system is provided in which the transmission of light along an optical fiber path is varied in accordance with the magnitude of a parameter being sensed. The sensing system provides an increase in the sensitivity to the parameter being detected, controls the linearity of the transfer function between parameter and detected light variation and can be optically configured to limit sensitivity to a single axis.

In one embodiment an optical system such as a lens or reflector is positioned between input and output optical fibers and adapted to move in response to physical parameters such as acceleration, temperature or pressure. The lens focuses the light between the input and output optical fibers and provides an enhancement in the variation of the light passed into the output fiber with motion, thereby increasing the sensitivity of the transducer to the parameter being detected. The optical system in applications of acceleration sensing for geophysical exploration, may include a set of cylindrical lenses which linearize the response of the system and eliminates sensitivity to acceleration except along a single axis. The optical system may be either a refracting or reflecting type and in the latter case the input and output optical fibers are typically the same fiber.

In a further embodiment the optical system includes a pair of stationary lenses with a moving aperture or a single stationary lens system with a moving reflective dot.

An optical fiber pair is optionally used as the output fiber with the light intensity in each paired fiber independently detected, summed and differenced. The difference is ratioed to the sum to provide an output indicative of the sensed parameter. The ratioing reduces system sensitivity to variations, such as source intensity, that do not reflect the parameter being detected.

BRIEF DESCRIPTION OF THE DRAWING

These and other features of the present invention are more fully set forth below in the solely exemplary detailed description and accompanying drawing of which.

DETAILED DESCRIPTION OF THE INVENTION

Figure 1:
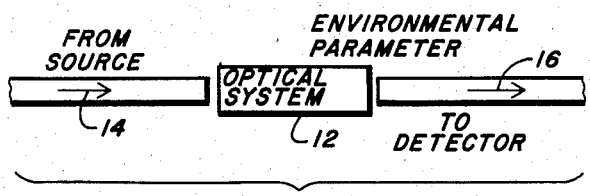
FIG. 1 is a generalized block diagram of an optical sensing system according to the present invention.
Figure 2:
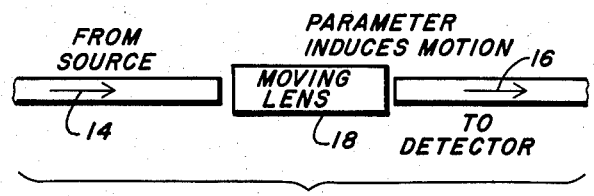
FIG. 2 is a block diagram illustrating one general implementation of the invention of FIG. 1.

The present invention contemplates a system for sensing an environmental parameter through its motional effect upon an optical system 12 as illustrated in FIG. 1. The optical system 12 is positioned to receive light from an input optical fiber 14 and to apply that light to an output optical fiber 16 with an attenuation characteristic of the sensed parameter and in particular of the degree to which that parameter affects the position of the optical system 12. In a first general implementation of the invention as illustrated in FIG. 2, the optical system 12 comprises a moving lens 18 positioned between the input and output optical fibers 14 and 16 and operative to provide a focusing function on the light transmitted therebetween. The focusing function enhances the sensitivity of the optical system to the motion induced in the lens 18 by the parameter being detected.

Figure 3:
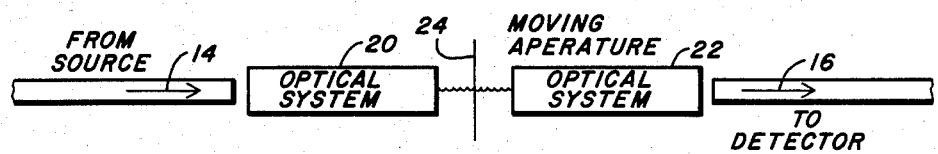
FIG. 3 is a block diagram illustrating a second general implementation of the invention of FIG. 1.

In a second general embodiment illustrated in FIG. 3, the optical system includes first and second stationary optical system 20 and 22 having a moving aperture 24 located therebetween and motionally responsive to the parameter being sensed. The optical system 20 provides focusing of the light from the input fiber 14 for transmission through the moving aperture 24 while the optical system 22 provides typically a similar refocusing of the light emanating through the aperture 24 into the output fiber 16. The light received by the optical system 22 from the aperture 24 is attenuated in accordance with the position of the aperture 24.

The moving lens 18 and the optical systems 20 and 22 are typically refractive in the embodiments illustrated in FIGS. 2 and 3, but are reflective in other embodiments in which case the output fiber 16 is typically positioned adjacent to or combined with the input fiber 14 in order to receive the reflected radiation. In a reflective alternative to the embodiment of FIG. 3, the moving aperture 24 is replaced by a moving reflective spot and the output fiber 16 is placed adjacent to or combined within the input fiber 14. The optical system 22 in such case is unnecessary.

Figure 4:
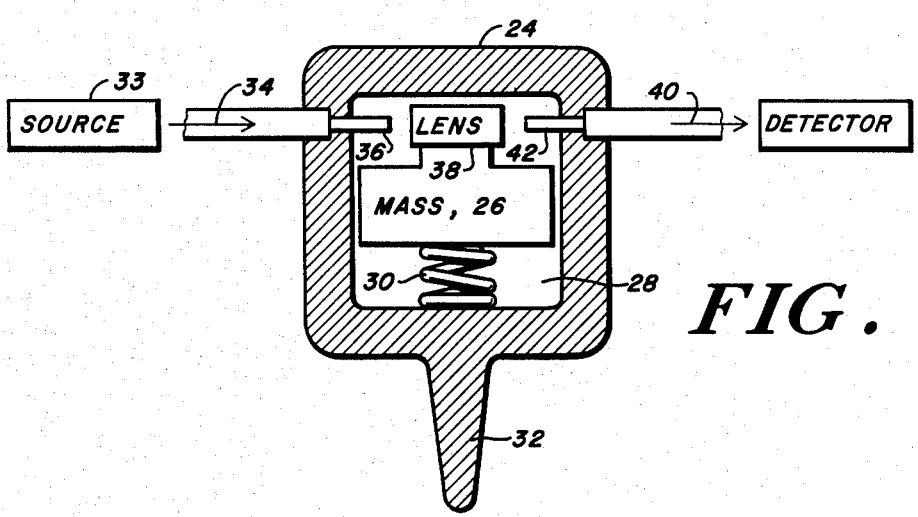
FIG. 4 is a detail of an accelerometer according to a first embodiment for FIG. 2 of the invention.

The present invention finds specific utilities in the detection of acceleration in geophysical exploration, and is operative there to measure the magnitude and direction of shock waves generated by subterranean explosions. As shown in FIG. 4, a casing 24 contains a mass 26 which is elastically supported within an interior cavity 28 of the casing 24 by a spring system 30. The casing 24 includes a spike 32 to facilitate its being secured in the earth.

An input optical fiber cable 34 from a light source 33 is applied through the casing 24 such that an inner, light conducting glass fiber 36 penetrates into the cavity 28, to apply light to a grin lens 38 secured to the mass 26. An output optical fiber cable 40 similarly penetrates the casing 24 and has its inner light conducting glass fiber 42 positioned to receive light focused by the grin lens 38 as received from the input fiber 34.

The input and output fibers 34 and 40 are typically multi-mode optical fibers and the grin lens 38, as known in the art, is a refractive cylinder having a graded index of refraction in the radial direction to provide a focusing function. Because of the focusing effect of the grin lens 38 and the presence of two relatively moving interfaces between the grin lens 38 and respective optical fibers 34 and 40, the sensitivity of the attenuation characteristic in the light received in the output optical fiber 40 is greatly enhanced over that found in moving fiber sensors of the prior art.

Figure 5:
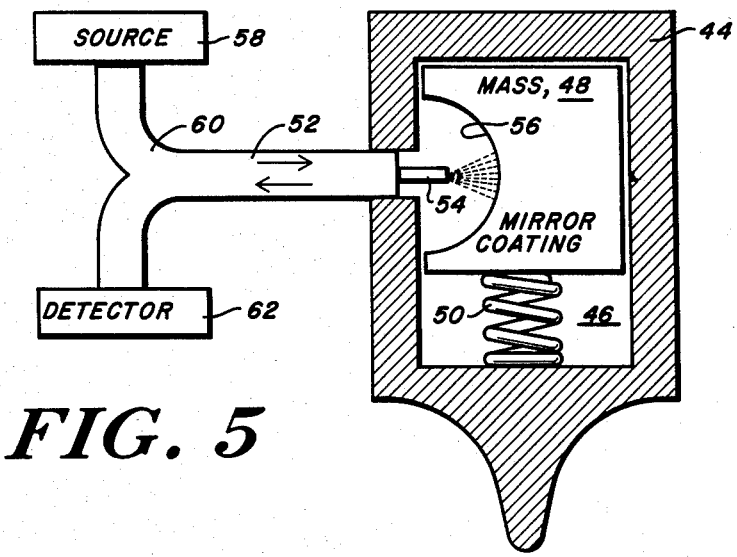
FIG. 5 is a detail of an accelerometer according to a second embodiment of FIG. 2 of the present invention.

A modification of the accelerometer of FIG. 4 is illustrated in FIG. 5 in which reflection is substituted for the refractive properties of the grin lens 38. In FIG. 5 a casing 44 is provided substantially similar to the casing 24 in FIG. 4. The casing 44 surrounds an interior cavity 46 having a mass 48 elastically supported therein by a spring 50. A single optical fiber cable 52 is applied through the casing 44 such that the light transmitting glass fiber 54 directs light toward a concave reflecting surface 56 formed within the mass 48. The reflective surface 56 provides a positionally sensitive reflecting characteristic which, in the manner of the grin lens 38 of FIG. 4, attenuates the light reflected back into the fiber 52 and in particular the glass transmissive portion 54, in accordance with the position of the mass 48. While only a single interface between relatively moving elements 54 and 56 is provided, because the light travels in both directions across the interface, the same sensitivity enhancement associated with the embodiment of FIG. 4 is experienced in the embodiment of FIG. 5. The optical fiber 52 is used for bi-directional transmission of light from a source 58 through a coupler 60 for application to the reflecting surface 56. Light reflected back into the fiber 52 is separated by coupler 60 for application to a detector 62. Detector 62 is of conventional design or operates in accordance with the detection systems illustrated in my copending and commonly assigned application Ser. No. 403,125, filed 7-29-82 (ATL-102) incorporated herein by reference.

Figure 6:
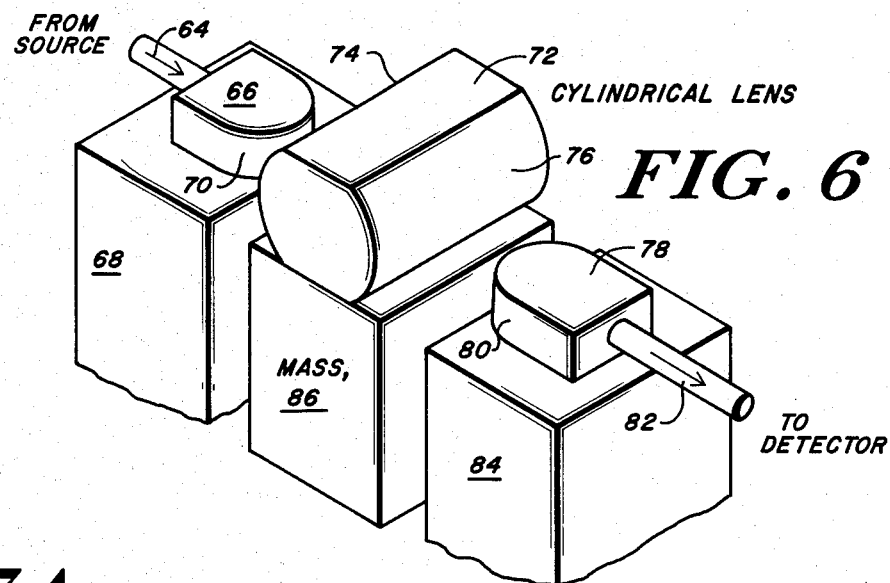
FIG. 6 is a detail of an optical system for use in the present invention to provide linearity and sensitivity solely along a single axis.

The system of FIG. 4 may be modified as illustrated generally in FIG. 6 to provide linearity between acceleration induced position changes and resulting attenuation of light in the output fiber as well as to limit the accelerometer sensitivity to forces in a single direction. As shown in FIG. 6, light from a input optical fiber 64 is applied to a first cylindrical lens 66 which is attached through a support 68 to the casing or other housing for the accelerometer. The cylindrical lens 66 provides dispersal substantially in the horizontal direction through a refractive surface 70 of a cylindrical shape in which the cylindrical axis runs vertically. The light emanating from the cylindrical lens 66 is applied to a second, convex cylindrical lens 72 onto a first cylindrical surface 74 having a horizontal cylindrical axis. Light exits the cylindrical lens 72 through a second partial cylindrical surface 76 also having a horizontal cylindrical axis. Light from the lens 72 is directed towards a further cylindrical lens 78, similar to the lens 66, and having a cylindrical surface 80 facing the lens 72 and its convex surface 76. Light received by the cylindrical lens 78 is applied to an output optical fiber 82 for detection as described above. The cylindrical lens 78, like the cylindrical lens 66 is attached through a support 84 rigidly coupling lens 78 to the case or housing of the accelerometer.

The cylindrical lens 72 is attached to a mass 86 which is resiliently supported from the case or housing to permit relative motion between lens 72 and lenses 66 and 78.

In operation, the combination of the cylindrical lenses 66, 72 and 78 produce a sensitivity to vertical motion of the mass 86 in the percent of light received by lens 78 and applied to the fiber 82 but substantially no sensitivity to horizontal movement of the mass 86.

Figure 7A:
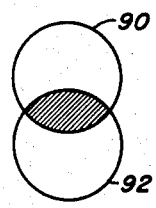
FIGS. 7A and 7B illustrate the control over linearity in accordance with the sensor of the present invention.
Figure 7B:
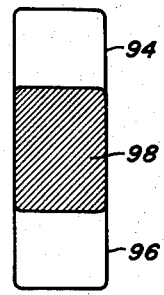

In FIG. 6, linearity is achieved in the transfer function between light transmitted to fiber 82 and vertical position of the lens 72 as illustrated in FIGS. 7A and 7B. FIG. 7A illustrates an acceptance spot 90 for light received by the output fiber of FIGS. 4 or 5 while a focus spot 92 corresponds to the image passed from the input fiber by reflection or refraction toward the output fiber. The area of overlap, representing the transmitted percentage of light, between the two spots 90 and 92 is not linearly related to their relative positions.

In FIG. 7B, however, the use of the cylindrical lenses provides a rectangular acceptance spot 94 for the output fiber 78 and corresponding cylindrical lens 78 acceptance area, and at the same time provides a rectangle 96 for the focused radiation from the input fiber 64 in combination with the cylindrical lens 66. The zone of overlap 98 between the rectangles 94 and 96 will vary in area linearly with the relative vertical position of the two spots, corresponding to vertical position of the mass 86. The cylindrical lens 72 affects the spot 96 producing an insensitivity to vertical motion or misalignment between the spot 94 and spot 96.

Figure 8:
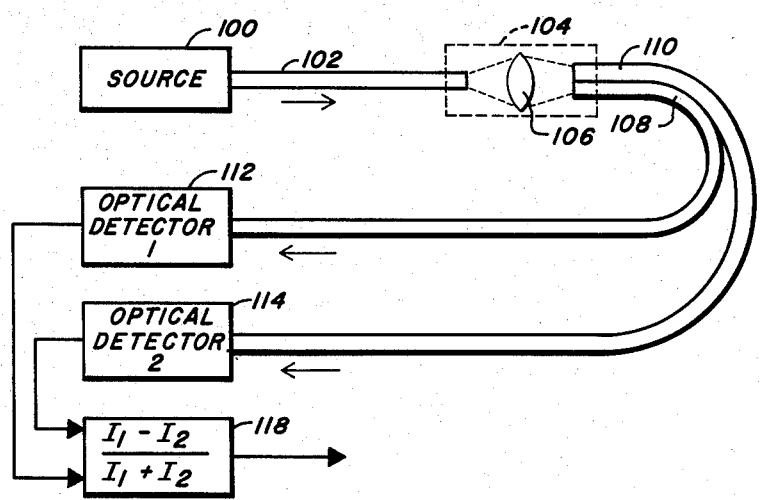
FIG. 8 illustrates a ratio detecting implementation of the present invention.

FIG. 8 illustrates a detecting system for use in the present invention in which variations in source intensity or optical path transmissivity with time are eliminated from the detected parameter using a ratio detecting feature. As shown there a light source 100 applies radiation to an optical fiber 102 which is coupled to a sensor 104 typically one of the types illustrated above. Within the sensor 104 a moving lens or other refractive or reflective element 106 focuses light from the input fiber to an adjacent pair of output fibers 108 and 110. The fibers 108 and 110 will receive relatively greater or lesser intensities of radiation from the moving lens 106 in accordance with its position as governed by the parameter being sensed. The fibers 108 and 110 are separated and applied to respective detectors 112 and 114 which provide an electrical output corresponding to the magnitude of the received light intensity. The outputs of the detectors 112 and 114, represented by the magnitudes I1 and I2 respectively are applied to a ratioing circuit 118 which provides an output signal corresponding to the difference between the two intensities divided by the sum of the two intensities. For relatively small intensity differences, the ratioing effect completely cancels any variations in the absolute magnitude of the intensity signals, felt evenly in both of the output optical fibers 108 and 110, resulting from such effects as variations in the output intensity from the source 100.

Figure 9:
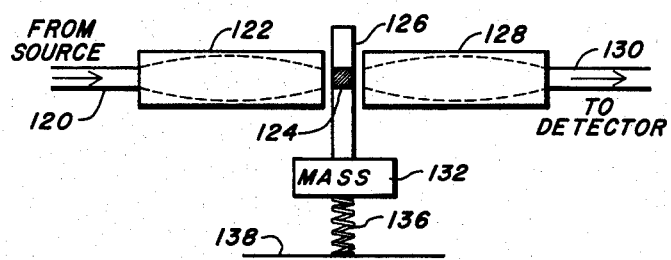
FIG. 9 illustrates a detailed implementation of an accelerometer according to the generalized approach of FIG. 3.

With respect to FIG. 9 an embodiment of the invention, generally illustrated in FIG. 3, is shown in which an input optical fiber 120 applies radiation to a lens 122, typically a grin lens, and therefrom through an aperture 124 in a movable plate 126. Light from the aperture 124 is applied through a further grin lens 128 where it is focused for application to an output optical fiber 130.

The plate 126 is supported from a mass 132 resiliently supported by a spring 136 from a support structure 138 such as the housing of the accelerometer of FIG. 9. Motion of the aperture 124 varies the percentage of light transmitted by it and received by the lens 128 within the acceptance circle for the output fiber 130. The presence of two interfaces between relatively moving plate 126 and lenses 122 and 128 again provides an increase in sensitivity to the force or acceleration being sensed.

Figure 10:
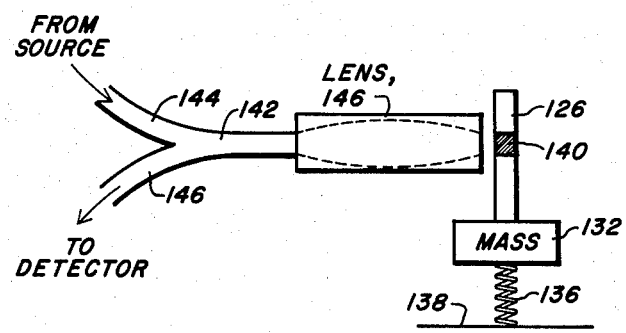
FIG. 10 illustrates a second embodiment of an accelerometer according to the implementation of FIG. 3.

The embodiment illustrated in FIG. 9 may be altered to achieve the embodiment illustrated in FIG. 10 by use of a reflecting spot 140 on the moving plate 126 in lieu of the aperture 124. In this case, an input optical fiber 142 receives light through a coupling 144 from a light source for application through a grin lens 146 toward the plate 126 and spot 140. The position of the plate 126 determines the amount of applied light f... on the spot 140 which in turn varies the amount of reflected radiation passed and focused through the grin lens 146 to the optical fiber 142 for transmission in the reverse direction through coupler 144 where it is separated onto an output path 146 for application to a detector.

Figure 11:
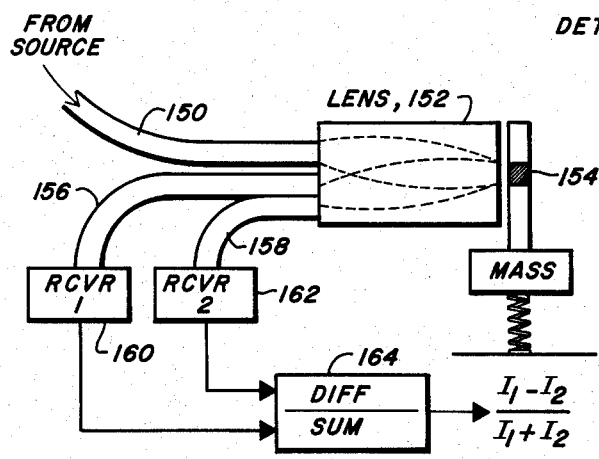
FIG. 11 illustrates a ratio detecting implementation of the embodiment of FIG. 10.

The system of FIG. 10 may be operated with separate input and output optical fibers and in particular with a pair of output optical fibers for use in ratio detection as illustrated in FIG. 11. As shown there an input optical fiber 150 applies radiation to a grin lens 152 for focusing onto a reflecting spot 154 on the moving plate 126. In the null position of the sensor of FIG. 11, reflected radiation from the spot 154 is directed evenly between the acceptance spots of paired output optical fibers 156 and 158. The fibers 156 and 158 are applied to respective receivers 160 and 162 which provide a corresponding output signal, of magnitudes I1 and I2. These signals are applied in turn to a ratio detecting circuit 164 which performs the function of ratioing the difference between the intensities to their sum to provide a final output indication of the parameter sensed without sensitivity to other effects.

Figure 12:
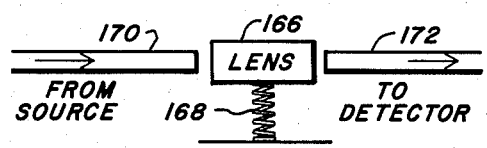
FIG. 12 illustrates the application of the present invention to detect temperature.

The present invention may be applied not only to the detection of acceleration as illustrated above but, to detection of temperature as illustrated, in one exemplary embodiment, in FIG. 12. As shown there, a lens 166 is supported by a thermally responsive coil 168 between input and output optical fibers 170 and 172. Variation in temperature, changes the dimension of the coil 168 and correspondingly the position of the lens 166 between the fibers 170 and 172 producing a variation in the intensity of light transmitted from fiber 170 to 172. Detection of this variation is typically as noted above for the case of acceleration.

Figure 13:
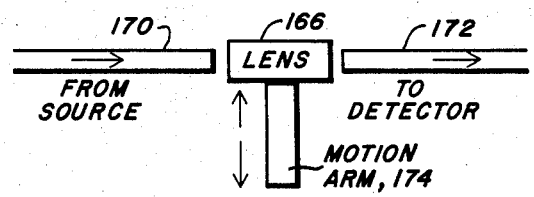
FIG. 13 illustrates the application of the present invention to the detection of motion.

FIG. 13 illustrates the present invention in an application to the general detection of motion. In this case, the lens 166 is supported between the input and output optical fibers 170 and 172 upon an arm 174 coupled to a motion-producing element. The lens 166 is utilized to sense the corresponding element motion.

Figure 14:
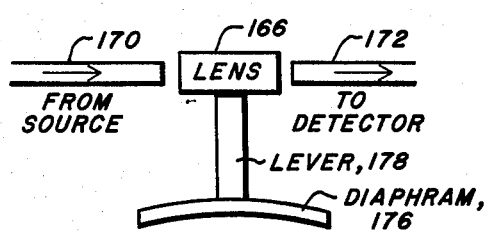
FIG. 14 illustrates the application of the present invention to the detection of pressure.

FIG. 14 illustrates the use of lens 166 between input and output fibers 170 and 172 to sense pressure. The pressure variation moves a diaphragm 176 coupled through an arm 178 to the lens 166.

The above described fiber optical sensor system provides an enhanced sensitivity to the parameter being detected, along with the capability of achieving a linearity in the response of the sensor to the detected parameter and the ability to limit the sensitivity of the sensor to a single axial dimension. The specific detailed description given above is intended as illustrative of these features, the actual scope of the invention being solely as indicated in the following claims.

What is claimed is:

1. A system for sensing a parameter comprising:
   a optical system having means for focusing light, said focusing means being positionally responsive to an environmental parameter;
   means for applying light through said optical system with the light exiting said optical system varying in intensity in response to the position of the light focusing means of said optical system; and
   means for detecting the amplitude of the light exiting from said optical system to provide an output indication of position of said optical system, said optical system having a focusing characteristic which controls the sensitivity of said system to said parameter, said focusing means including means for limiting the motion thereof such that said focusing means is sensitive to motion in a first direction to vary the light transmitted through said optical system and such that said system is relatively insensitive to motion in a second, orthogonal direction in the amount of light applied through said optical system.

2. The system of claim 1 wherein said system includes a light source and a light detector and wherein said focusing means includes cylindrical lenses positioned between said source and said detector.

3. The system of claim 1 wherein said light applying means includes a first optical fiber and said detecting means includes a second optical fiber located to receive light exiting from said optical system.

4. The system of claim 3 wherein said second optical fiber includes first and second light conducting paths and wherein said detecting means includes first and second light detectors responsive respectively to light on said first and second paths.

5. The system of claim 4, further including means for ratioing the difference in the outputs of said first and second detectors to the sum of the outputs of said first and second detectors to provide said indication of position.

6. The system of claim 1 wherein said optical system includes means, exclusive of said focusing means, for providing a substantially linear relationship between position of said focusing means and intensity of light exiting said optical system.

7. A system for sensing a parameter comprising:
- an optical system having means of focusing light, said focusing means being positionally responsive to an environmental parameter;
- means for applying light through said optical system with the light exiting said optical system varying in intensity in response to the position of the light focusing means of said optical system and,
- means for detecting the amplitude of the light exiting from said optical system to provide an output indication of position of said optical system, said optical system having a focusing characteristic which controls the sensitivity of said system to said parameter, said light applying means including a first optical fiber and said detecting means including a second optical fiber located to receive light exiting from said optical system, said second optical fiber including first and second light conducting paths, said detecting means including first and second light detectors responsive respectively to light on said first and second paths, said system further including means for ratioing the difference in the outputs of said first and second detectors to the sum of the outputs of said first and second detectors to provide said indication of position.

8. The system of either claim 1 or claim 7 wherein said optical systems includes means adapted to provide positional sensitivity to a parameter selected from the group consisting of temperature, acceleration, and pressure, or combinations thereof.

* * * * *